United States Patent
Ambrus et al.

(10) Patent No.: US 12,045,998 B2
(45) Date of Patent: Jul. 23, 2024

(54) SYSTEMS AND METHODS FOR NEURAL IMPLICIT SCENE REPRESENTATION WITH DENSE, UNCERTAINTY-AWARE MONOCULAR DEPTH CONSTRAINTS

(71) Applicant: Toyota Research Institute Inc., Los Altos, CA (US)

(72) Inventors: Rares Ambrus, San Francisco, CA (US); Sergey Zakharov, San Francisco, CA (US); Vitor C. Guizilini, Santa Clara, CA (US); Adrien Gaidon, San Jose, CA (US)

(73) Assignee: TOYOTA RESEARCH INSTITUTE, INC., Los Altos, CA (US)

( * ) Notice: Subject to any disclaimer, the term of this patent is extended or adjusted under 35 U.S.C. 154(b) by 190 days.

(21) Appl. No.: 17/747,531

(22) Filed: May 18, 2022

(65) Prior Publication Data

US 2023/0377180 A1    Nov. 23, 2023

(51) Int. Cl.
*G06T 7/55* (2017.01)
*G06T 15/08* (2011.01)
*G06V 10/774* (2022.01)

(52) U.S. Cl.
CPC ............. *G06T 7/55* (2017.01); *G06T 15/08* (2013.01); *G06V 10/774* (2022.01);
(Continued)

(58) Field of Classification Search
CPC . G06T 7/55; G06T 15/08; G06T 2207/10024; G06T 2207/20081; G06T 2207/20084; G06V 10/774
See application file for complete search history.

(56) References Cited

U.S. PATENT DOCUMENTS 11,748,940 B1 * 9/2023 Xian .................. G06N 3/08
                                                        345/419
11,798,183 B2 * 10/2023 Zhu ..................... G05D 1/0251
(Continued)

FOREIGN PATENT DOCUMENTS

CN      111127536 A     5/2020
CN      110443874 B     7/2021
(Continued)

OTHER PUBLICATIONS

Learning depth via leveraging semantics: self-supervised monocular depth estimation with both implicit and explicit semantic guidance (https://arxiv.org/pdf/2102.06685.pdf) Feb. 11, 2021.
(Continued)

*Primary Examiner* — Yu Chen
(74) *Attorney, Agent, or Firm* — DINSMORE & SHOHL LLP

(57) ABSTRACT

In accordance with one embodiment of the present disclosure, a method includes receiving a set of images, each image depicting a view of a scene, generating sparse depth data from each image of the set of images, training a monocular depth estimation model with the sparse depth data, generating, with the trained monocular depth estimation model, depth data and uncertainty data for each image, training a NeRF model with the set of images, wherein the training is constrained by the depth data and uncertainty data, and rendering, with the trained NeRF model, a new image having a new view of the scene.

17 Claims, 6 Drawing Sheets

(52) U.S. Cl.
CPC .............. *G06T 2207/10024* (2013.01); *G06T 2207/20081* (2013.01); *G06T 2207/20084* (2013.01)

(56) References Cited

U.S. PATENT DOCUMENTS

2021/0183083 A1* 6/2021 Yan ........................... G06T 5/70
2023/0334806 A1* 10/2023 Xiao ......................... G06N 3/08

FOREIGN PATENT DOCUMENTS

| CN | 113112592 A | 7/2021 | | |
|---|---|---|---|---|
| CN | 113313732 A | 8/2021 | | |
| WO | 2021173489 A1 | 2/2021 | | |
| WO | WO-2023014368 A1 * | 2/2023 | ............ | G06T 5/005 |
| WO | WO-2023080921 A1 * | 5/2023 | | |

OTHER PUBLICATIONS

NeRF++: Analyzing and Improving Neural Radiance Fields (https://arxiv.org/pdf/2010.07492.pdf) Oct. 21, 2021.
Depth-supervised NeRF: Fewer Views and Faster Training for Free (https://arxiv.org/pdf/2107.02791.pdf) Jul. 6, 2021.
3D Packing for Self-Supervised Monocular Depth Estimation (https://arxiv.org/pdf/1905.02693.pdf) Mar. 28, 2020.
NerfingMVS: Guided Optimization of Neural Radiance Fields for Indoor Multi-view Stereo (https://arxiv.org/pdf/2109.01129.pdf) Sep. 2, 2021.

* cited by examiner

SYSTEMS AND METHODS FOR NEURAL IMPLICIT SCENE REPRESENTATION WITH DENSE, UNCERTAINTY-AWARE MONOCULAR DEPTH CONSTRAINTS

TECHNICAL FIELD

The present disclosure relates to computational view synthesis, and more particularly to reconstructing 3-dimensional (3D) scenes from multi-view images with neural radiance fields (NeRFs).

BACKGROUND

Neural implicit representations (and particularly Neural Radiance Fields or NeRFs) are ways of encoding a scene given a set of input images. The scene is encoded in the weights of a neural network, which can subsequently be used to render views of the scene from novel viewpoints (i.e., not the same viewpoints used to capture the original images).

However, one downside of NeRFs is that they require a high number of input images distributed around the scene. When using only a few images, NeRFs offer poor generalization (i.e., the novel views have low quality). Related work has traced this to the "shape-radiance" ambiguity problem, where any arbitrary geometry can be used to represent a set of input images given a complex enough network. Moreover, other related work relies on a traditional, feature-based method, which is known to fail in textureless regions as well as regions with high dynamics. These learning problems can lead to increased rendering times and reduced generalization.

Therefore, efficient strategies for improving generalization and view synthesis in the context of neural implicit representations from RGB images are desired.

SUMMARY

In accordance with one embodiment of the present disclosure, a method includes receiving a set of images, each image depicting a view of a scene, generating sparse depth data from each image of the set of images, training a monocular depth estimation model with the sparse depth data, generating, with the trained monocular depth estimation model, depth data and uncertainty data for each image, training a NeRF model with the set of images, wherein the training is constrained by the depth data and uncertainty data, and rendering, with the trained NeRF model, a new image having a new view of the scene.

In accordance with another embodiment of the present disclosure, a system includes a processor configured to perform operations including receiving a set of images, each image depicting a view of a scene, generating sparse depth data from each image of the set of images, training a monocular depth estimation model with the sparse depth data, generating, with the trained monocular depth estimation model, depth data and uncertainty data for each image, training a NeRF model with the set of images, wherein the training is constrained by the depth data and uncertainty data, and rendering, with the trained NeRF model, a new image having a new view of the scene.

In accordance with yet another embodiment of the present disclosure, a non-transitory medium has machine-readable instructions that, when executed by a processor, cause the processor to perform operations including receiving a set of images, each image depicting a view of a scene, generating sparse depth data from each image of the set of images, training a monocular depth estimation model with the sparse depth data, generating, with the trained monocular depth estimation model, depth data and uncertainty data for each image, training a NeRF model with the set of images, wherein the training is constrained by the depth data and uncertainty data, and rendering, with the trained NeRF model, a new image having a new view of the scene.

Although the concepts of the present disclosure are described herein with primary reference to captured images, it is contemplated that the concepts will enjoy applicability to any image regardless of method of capture. For example, and not by way of limitation, it is contemplated that the concepts of the present disclosure will enjoy applicability to computer-generated graphics.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

The embodiments disclosed herein include systems and methods for neural implicit scene representation with dense, uncertainty-aware monocular depth constraints. Embodiments disclosed herein constrain the learning problem described above by utilizing a neural network that takes as input an RGB image and outputs scene depth and uncertainty data, which allows for the ability to impose dense depth and uncertainty supervision in NeRF model training.

Figure 1:
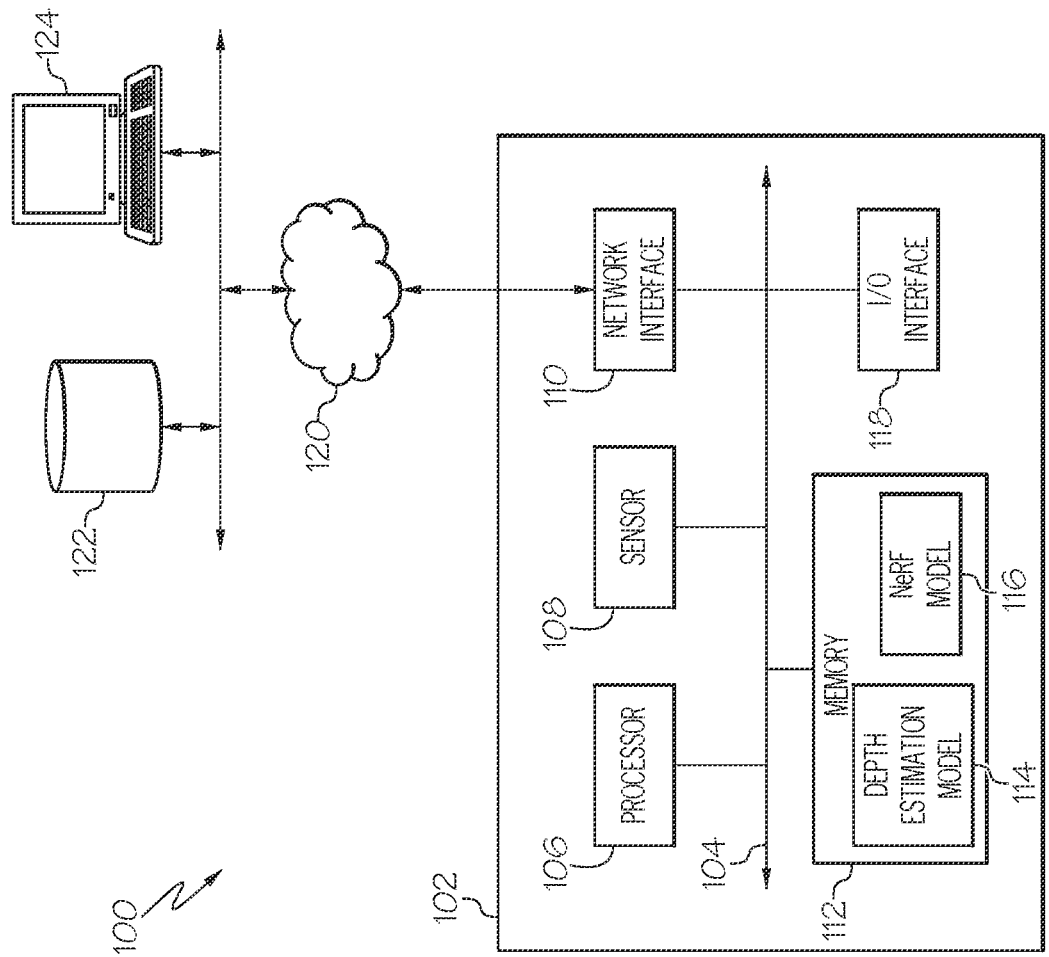
FIG. 1 schematically depicts an illustrative system, according to one or more embodiments shown and described herein.

Referring now to FIG. 1, a system 100 is schematically depicted. The system 100 may include a computing device 102. The computing device 102 may be a server including computing components such as a processor 106, a memory module 112, a network interface 110, an input/output interface (I/O interface 118), and a sensor 108. The computing device 102 also may include a communication path 104 that communicatively connects the various components of the computing device 102. The computing device 102 may connect to remote services 122 and user devices 124 via a network 120. It should be understood that the components of the computing device 102 described are exemplary and may contain more or less than the number of components shown.

The processor 106 may include one or more processors that may be any device capable of executing machine-readable and executable instructions. Accordingly, each of the one or more processors of the processor 106 may be a controller, an integrated circuit, a microchip, or any other computing device. The processor 106 is coupled to the communication path 104 that provides signal connectivity between the various components of the computing device 102. Accordingly, the communication path 104 may communicatively couple any number of processors of the processor 106 with one another and allow them to operate in a distributed computing environment. Specifically, each processor may operate as a node that may send and/or receive data. As used herein, the phrase "communicatively coupled" means that coupled components are capable of exchanging data signals with one another, such as, e.g., electrical signals via a conductive medium, electromagnetic signals via air, optical signals via optical waveguides, and the like.

The communication path 104 may be formed from any medium that is capable of transmitting a signal such as, e.g., conductive wires, conductive traces, optical waveguides, and the like. In some embodiments, the communication path 104 may facilitate the transmission of wireless signals, such as Wi-Fi, Bluetooth, Near-Field Communication (NFC), and the like. Moreover, the communication path 104 may be formed from a combination of mediums capable of transmitting signals. In one embodiment, the communication path 104 comprises a combination of conductive traces, conductive wires, connectors, and buses that cooperate to permit the transmission of electrical data signals to components such as processors, memories, sensors, input devices, output devices, and communication devices. Additionally, it is noted that the term "signal" means a waveform (e.g., electrical, optical, magnetic, mechanical, or electromagnetic), such as DC, AC, sinusoidal-wave, triangular-wave, square-wave, vibration, and the like, capable of traveling through a medium.

The memory module 112 is communicatively coupled to the communication path 104 and may contain one or more memory modules comprising RAM, ROM, flash memories, hard drives, or any device capable of storing machine-readable and executable instructions such that the machine-readable and executable instructions can be accessed by the processor 106. The machine-readable and executable instructions may comprise logic or algorithms written in any programming language of any generation (e.g., 1GL, 2GL, 3GL, 4GL, or 5GL) such as, e.g., machine language, that may be directly executed by the processor, or assembly language, object-oriented languages, scripting languages, microcode, and the like, that may be compiled or assembled into machine-readable and executable instructions and stored on the memory module 112. Alternatively, the machine-readable and executable instructions may be written in a hardware description language (HDL), such as logic implemented via either a field-programmable gate array (FPGA) configuration or an application-specific integrated circuit (ASIC), or their equivalents. Accordingly, the methods described herein may be implemented in any conventional computer programming language, as pre-programmed hardware elements, or as a combination of hardware and software components.

The memory module 112 may include a monocular depth estimation model 114. The monocular depth estimation model 114 may be used to generate a set of depth and uncertainty data from a plurality of monocular RGB images. The monocular depth estimation model 114 may be trained on sparse depth data obtained from the plurality of monocular RGB images. The sparse depths can be obtained using self-supervised-learning methods that can predict depth for each image. Non-learning-based methods, such as COLMAP and other multi-view stereo algorithms, may also be used to generate sparse depth data despite their reduced speed. The monocular depth estimation model 114 may be a hardware module coupled to the communication path 104 and communicatively coupled to the processor 106. The monocular depth estimation model 114 may also or instead be a set of instructions contained in the memory module 112. The monocular depth estimation model 114 may utilize supervised methods to train a machine learning model based on labeled training sets, wherein the machine learning model is a decision tree, a Bayes classifier, a support vector machine, a convolutional neural network, and/or the like. In some embodiments, monocular depth estimation model 114 may utilize unsupervised machine learning algorithms, such as k-means clustering, hierarchical clustering, and/or the like. The monocular depth estimation model 114 may also be configured to perform the methods described herein, such as in regard to FIG. 4.

The memory module 112 may also include a NeRF model 116. The NeRF model 116 is a supervised machine learning model that comprises an input layer, one or more hidden layers, and an output layer that generates color features. The input layer may receive geometric features, such as position data (5D input (e.g., 3D location (x, y, z) and 2D viewing direction (θ, φ))), depth data, and/or uncertainty data. The one or more hidden layers may each have a weight for representing a differentiable rendering function. The output layer may generate a color and/or a volume density that, along with the data from the input layer, may be composited into an image using volume rendering techniques. The NeRF model 116 may be a hardware module coupled to the communication path 104 and communicatively coupled to the processor 106. The NeRF model 116 may also or instead be a set of instructions contained in the memory module 112. The NeRF model 116 may utilize supervised methods to train a machine learning model based on labeled training sets, wherein the machine learning model is a decision tree, a Bayes classifier, a support vector machine, a convolutional neural network, and/or the like. In some embodiments, NeRF model 116 may utilize unsupervised machine learning algorithms, such as k-means clustering, hierarchical clustering, and/or the like. The NeRF model 116 may also be configured to perform the methods described herein, such as in regard to FIG. 4.

The I/O interface 118 is coupled to the communication path 104 and may contain hardware for receiving input and/or providing output. Hardware for receiving input may include devices that send information to the processor 106. For example, a keyboard, mouse, scanner, touchscreen, and camera are all I/O devices because they provide input to the processor 106. Hardware for providing output may include devices from which data is sent. For example, an electronic display, speaker, and printer are all I/O devices because they output data from the processor 106.

The computing device 102 may also comprise the network interface 110. The network interface 110 is communicatively coupled to the communication path 104. The network interface 110 can be any device capable of transmitting and/or receiving data via a network or other communication mechanisms. Accordingly, the network interface 110 can include a communication transceiver for sending and/or receiving any wired or wireless communication. For example, the network interface 110 may include an antenna, a modem, an Ethernet port, a Wi-Fi card, a WiMAX card, a cellular modem, near-field communication hardware, satellite communication hardware, and/or any other wired or wireless hardware for communicating with other networks and/or devices. The network interface 110 communicatively connects the computing device 102 to external systems, such as user devices 124, via a network 120. The network 120 may be a wide area network, a local area network, a personal area network, a cellular network, a satellite network, and the like.

The system 100 may also include user devices 124. The user devices 124 may be one or more computing devices that may be in remote communication with the computing device 102 via network 120. The user devices 124 may include desktop computers, laptop computers, smartphones, and any other type of computing device in communication with the computing device 102 to operate the computing device 102 and/or request processing from the computing device 102. For example, user devices 124 may capture a plurality of images, transmit the plurality of images to the computing device 102, request that the computing device 102 generate an image of a new viewpoint of the subject based on the plurality of images, and receive the image from the computing device 102.

The system 100 may also include remote services 122. The user devices 124 may also include services that operate beyond the computing device 102 that may be utilized by the computing device 102, such as external databases, storage devices, computing platforms, and any other type of service. The remote services 122 may provide the same or improved capabilities of components of the computing device. For example, the remote services 122 may be a database having more memory than the memory module 112 or a processor with more computing power than the processor 106. It should be understood that any function that can be performed by the computing device may also or instead be performed remotely via an remote services 122.

The sensor 108 may be one or more sensors communicatively coupled to the processor 106. The sensor 108 may include an imaging sensor, a LIDAR sensor, and the like for capturing a visual representation of an object and/or a scene. The sensor 108 may be used to capture a plurality of images from a plurality of perspectives (e.g., different angles and/or directions). The sensors of the sensor 108 may be placed anywhere on the computing device 102, such as at the end effectors.

It should be understood that the components illustrated in FIG. 1 are merely illustrative and are not intended to limit the scope of this disclosure. More specifically, while the components in FIG. 1 are illustrated as residing within computing device 102, this is a non-limiting example. In some embodiments, one or more of the components may reside external to computing device 102.

Figure 2:
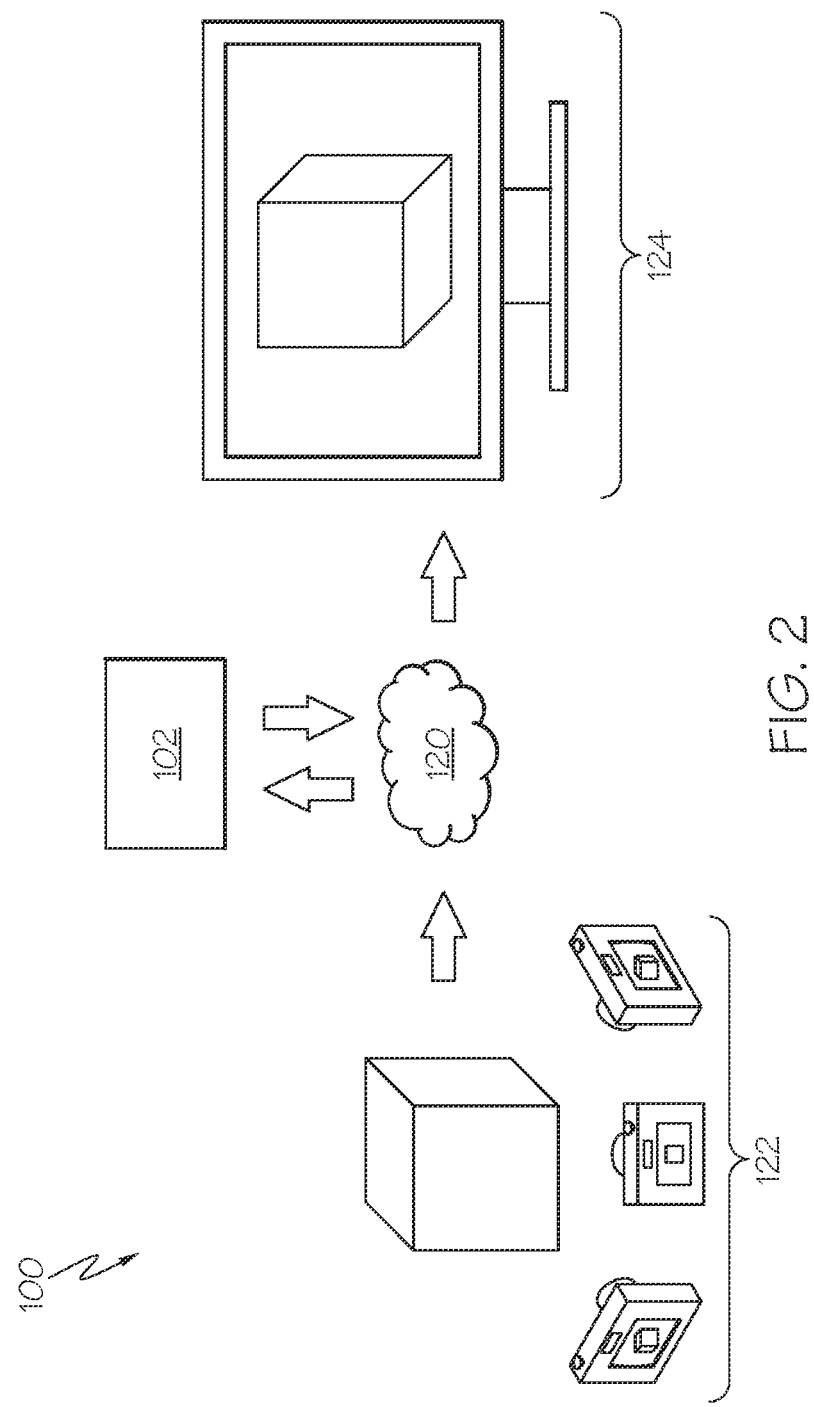
FIG. 2 depicts the illustrative external service and external device of FIG. 1, according to one or more embodiments shown and described herein.

Referring now to FIG. 2, the remote service 122 and user device 124 of a system 100 are depicted. The remote service 122 may be a web service (e.g., a database) that has a plurality of crowd-sourced images of a scene. The plurality of images may have different views around a hemisphere of a scene. The remote service 122 is configured to receive queries from other devices such as the computing device 102 and/or the user device 124. The remote service 122 may retrieve a plurality of images of a scene and transmit the plurality of images to the computing device 102 via network 120. The remote service 122 is also configured to receive queries from other devices such as the user device 124. For example, the user device 124 may query the computing device 102 to create new views of a scene dynamically. The computing device 102 may create a NeRF model for the scene of the plurality of images. Creating a NeRF model for the scene may comprise training a depth model (e.g., monocular depth estimation model 114 of FIG. 1) and a NeRF model (e.g., NeRF model 116 of FIG. 1). Once the NeRF model is trained, the computing device 102 may also receive from the user device 124 a viewing angle and direction, from which a new view may be generated and subsequently transmitted to the user device 124 via network 120. In some embodiments, the computing device 102 may transmit via network 120 the trained NeRF model to the user device 124 for use on the user device 124 because the computing device 102 has performed the most intensive portions of the work for creating a new view of a scene. In such embodiments, the user device 124 may be able to generate new views of the scene, which may be applicable in virtual reality, augmented reality, and many other computer graphics applications.

Figure 3:
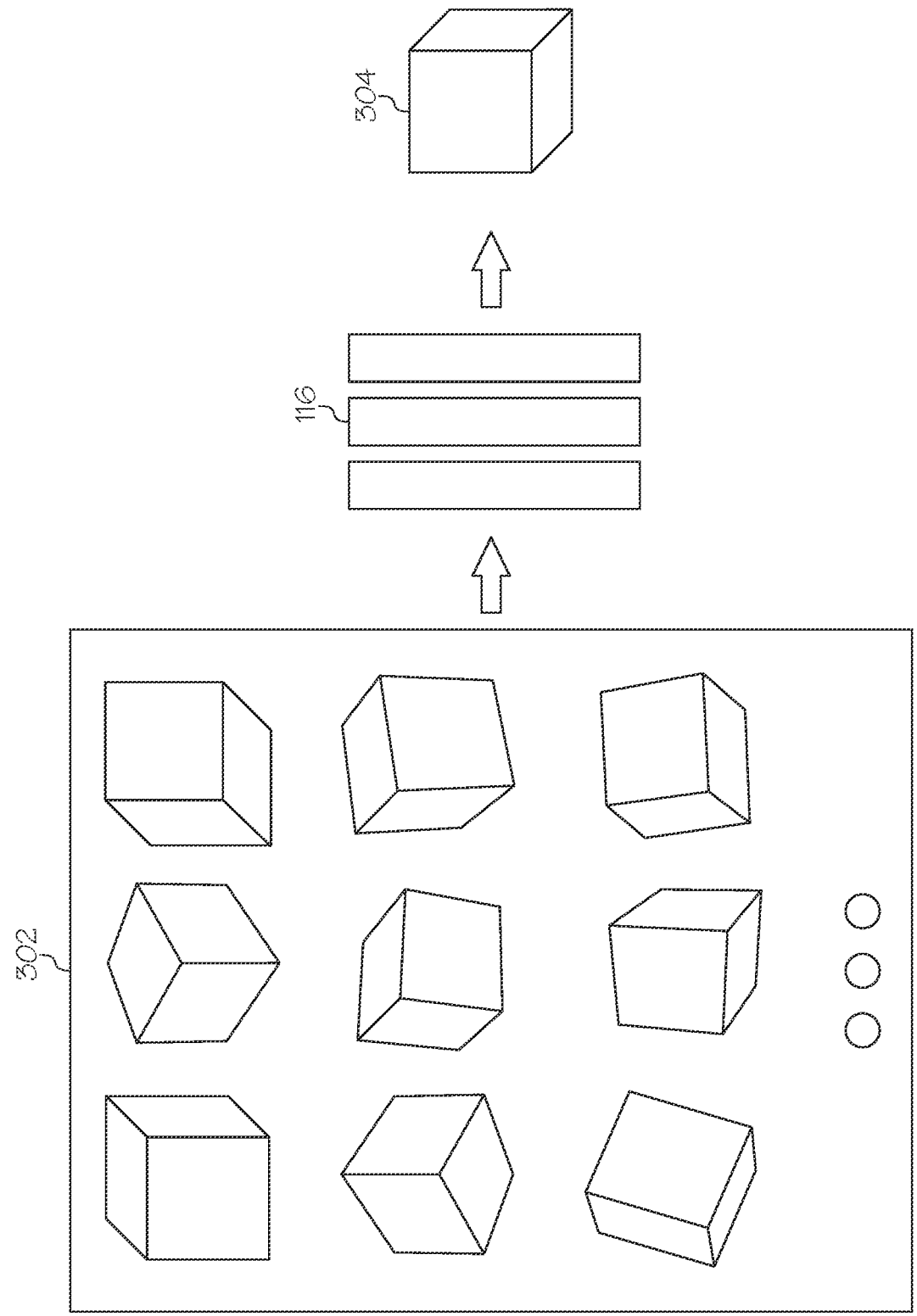
FIG. 3 depicts the illustrative NeRF model of FIG. 1, according to one or more embodiments shown and described herein.

Referring now to FIG. 3, the NeRF model 116 of the system 100 is depicted. The NeRF model 116 is a fully connected network, such as a multi-layer perceptron (MLP), that maps geometric features, such as spatial location and viewing direction (5D input), to color features, such as color and volume density (4D output). The training images 302 may be a set of images, each image containing a different view of a subject in a scene. The different views may be different in spatial position and/or direction on a surrounding hemisphere of the subject in the scene. The number of images may be as few as a dozen to greater than 1000. The NeRF model 116 may be a neural network trained on the training images 302. In training, the weights of the NeRF model 116 represent the scene of the training images 302. The weights of the NeRF model 116 are adjusted such that, when a spatial position (x, y, z) and direction ($\theta$, $\phi$) are input, a corresponding color (r, g, b) and volume density ($\sigma$) are output based on the training images 302. Once the NeRF model 116 is trained, the spatial positions in the space of the scene may be strung together to form a ray. The ray may point in any direction ($\theta$, $\phi$). The ray can be used to obtain a color (r, g, b) and volume density ($\sigma$) for a particular position (e.g., a depth) along the ray according to the direction ($\theta$, $\phi$) of the ray. To generate an output image 304, the NeRF model 116 may create a plurality of rays corresponding to the number of pixels of the output image 304, each ray facing the input direction ($\theta$, $\phi$). The plurality of rays may each produce a color and volume density. The input and output values may be composited into an image via any known volume rendering technique. Because the function that represents the NeRF model 116 is differentiable, it can be optimized by minimizing the residual between the output image and ground truth observations.

The problem with ordinary NeRF models is that the time it takes to optimize the NeRF model may vary from several hours to several days, depending on the resolution. To reduce the time it takes to optimize the NeRF model 116, the optimization of the NeRF model 116 may be further optimized by minimizing the residual between the depth values of the output image and known depth values from the input images. In some embodiments, the optimization time may be further reduced by imposing a denser level of supervision with an uncertainty value corresponding to the depth values.

Figure 4:
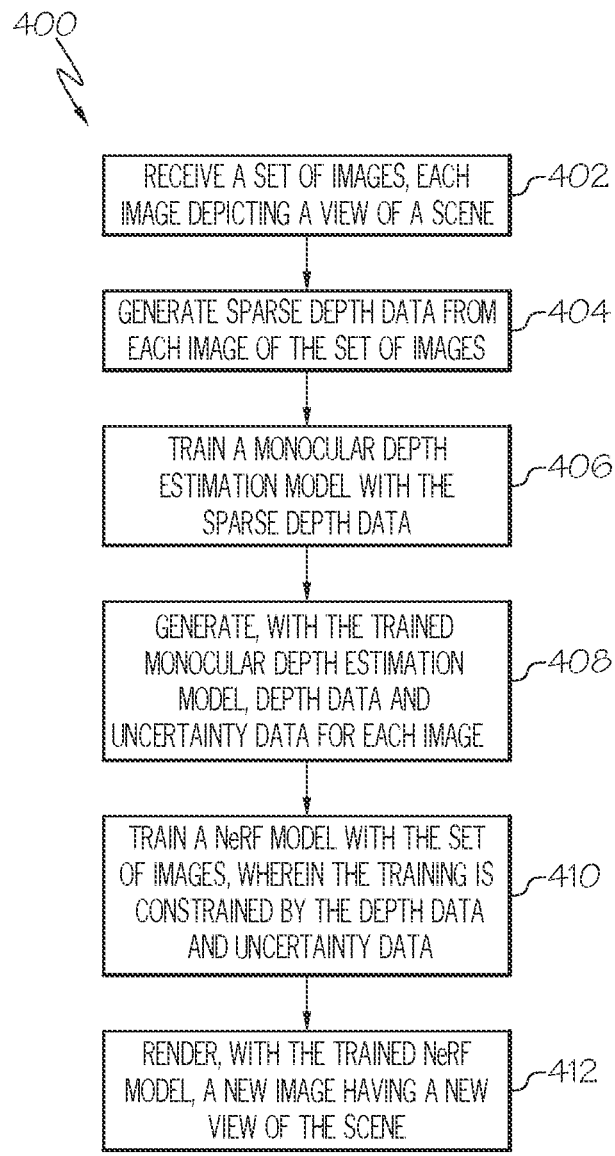
FIG. 4 depicts a flow diagram of an illustrative method carried out by the system of FIG. 1, according to one or more embodiments shown and described herein.

Referring now to FIG. 4, a flow diagram of a method 400 is depicted. The method 400 may be carried out by a system such as the system 100 of FIG. 1. The method 400 is not limited to the steps or order of steps as shown. The objective of the method 400 is to generate a new view of a scene based on a set of images of the scene. The new view may be one that is not included in the set of images. The method 400, unlike typical NeRF models, generates new views with a NeRF model that was trained on 5D position coordinates as well as depth and uncertainty data for all image pixels.

In step 402, the system 100 receives a set of images. Each image of the set of images depicts a view of a scene. A scene may include an environment and a subject. For example, the subject may be a vehicle, and the environment may be a roadway. A view of a scene may be a particular perspective of the scene. For example, one or more images may contain a view of the front of the subject, one or more images may contain a view of each side of the subject, and one or more images may contain a view of the rear of the subject. The images may be captured by a sensor, such as sensor 108 on the computing device 102, a sensor on the user device 124, or a sensor on any other device. The images may be stored in the memory, such as the memory module 112 of the computing device 102 or of remote services 122 (e.g., a database). The system 100 may receive the set of images by capturing the images or downloading the images from a repository from which they were stored by one or more other devices that captured the images. The images may be monocular RGB images. That is, color images captured from a single-lens sensor such as a camera.

In step 404, the system 100 generates sparse depth data from each image of the set of images. To generate sparse depth data, the system 100 utilizes an image-based 3D reconstruction algorithm, such as COLMAP. Image-based 3D reconstruction algorithms typically recover a sparse depth representation of the scene of the images. Image-based 3D reconstruction algorithms can also typically recover the camera poses, such as angle and direction of the input images using existing structure-from-motion (SfM) algorithms. To do so, the system 100 extracts geometric features and color features from each image of the set of images and represents them using a numerical descriptor. Next, the system 100 identifies matching geometric features and color features between images of the set of images. Matching may include exhaustive, sequential, spatial, transitive, or any other kind of matching. The identified matching geometric and/or color features can be used to determine a depth measurement at several points throughout each image. Because only a portion of geometric and/or color features may be matched, the determined depth measurement at the matched locations may typically occur at textured areas of each image, similarly illuminated areas of each image, visually overlapped areas of each image and areas covered by different views.

In step 406, the system 100 trains a monocular depth estimation model 114 with the sparse depth data. The depth measurements generated in step 404 may be compiled into a set of sparse depth data. The set of sparse depth data is used to train a monocular depth estimation model 114. As described above, the monocular depth estimation model 114 may utilize supervised methods to be trained, where the sparse depth data may provide the supervision. In some embodiments, the sparse depth data may also be used during the training of the NeRF model 116 to improve the speed of the training process.

In step 408, the system 100 generates depth data and uncertainty data for each image. After the monocular depth estimation model 114 is trained in step 406, the monocular depth estimation model 114 may receive an input image. For each pixel of the input image, the monocular depth estimation model 114 outputs an estimated depth along with an uncertainty level representing how certain the monocular depth estimation model 114 is that the estimated depth is accurate. Outputting depth and uncertainty data allows the system 100 to impose much denser supervision when training the NeRF model 116. In addition, predicting depth directly from an image via a trained neural network is a simpler process that may overcome systemic failures in traditional computer vision methods for estimating depth in an image. For example, traditional computer vision methods may consistently predict incorrect depths for a particular object. In which case, the multi-view constraint imposed to derive the uncertainty data will yield incorrect results, as the depth is consistent, although incorrect.

In step 410, the system 100 trains a NeRF model 116 with the set of images. The set of images may be the same set of images used to train the monocular depth estimation model 114. Like the monocular depth estimation model 114, the NeRF model 116 may be scene-specific (i.e., trained for the particular scene of the set of input images). The NeRF model 116 is a fully connected network that maps geometric features, such as spatial location and viewing direction (5D input), to color features, such as color and volume density (4D output). In training, the weights of the NeRF model 116 represent the scene of the training images 302. The weights of the NeRF model 116 are adjusted such that, when a spatial position (x, y, z) and direction (θ, φ) are input, a corresponding color (r, g, b) and volume density (σ) are output based on the set of images. In addition to mapping the geometric features to the color features, the training is also supervised by the depth data and uncertainty data generated from the monocular depth estimation model 114 in step 408. The supervision includes minimizing depth loss with the estimated depths from the monocular depth estimation model 114 generated in step 408. Because much of the depth data is estimated, however, the uncertainty data may be used as a weight to control how important a depth data point is and reduce the influence of potentially unreliable data points.

In step 412, the system 100 renders a new image having a new view of the scene. Once the NeRF model 116 is trained, the spatial positions in the space of the scene may be strung together to form a ray. The ray may point in any direction (θ, φ). Accordingly, rendering a new image includes inputting geometric features of the new view into the trained NeRF model 116. The geometric features correspond to the scene that the NeRF model 116 is trained for in step 410. The geometric features include a spatial position (x, y, z) and direction (θ, (p). The ray can be used to obtain a color (r, g, b) and volume density (σ) for a particular position (e.g., a depth) along the ray according to the direction (θ, φ) of the ray. The geometric features are input for each pixel and the corresponding color features are retrieved, the geometric features and the color features may be composited into a new image via a differentiable volume rendering function. The differentiable volume rendering function may be any volume rendering technique that takes pairs of color and volume density (e.g., opacity) features of three-dimensional points along rays to compute an output image.

Figure 5A:
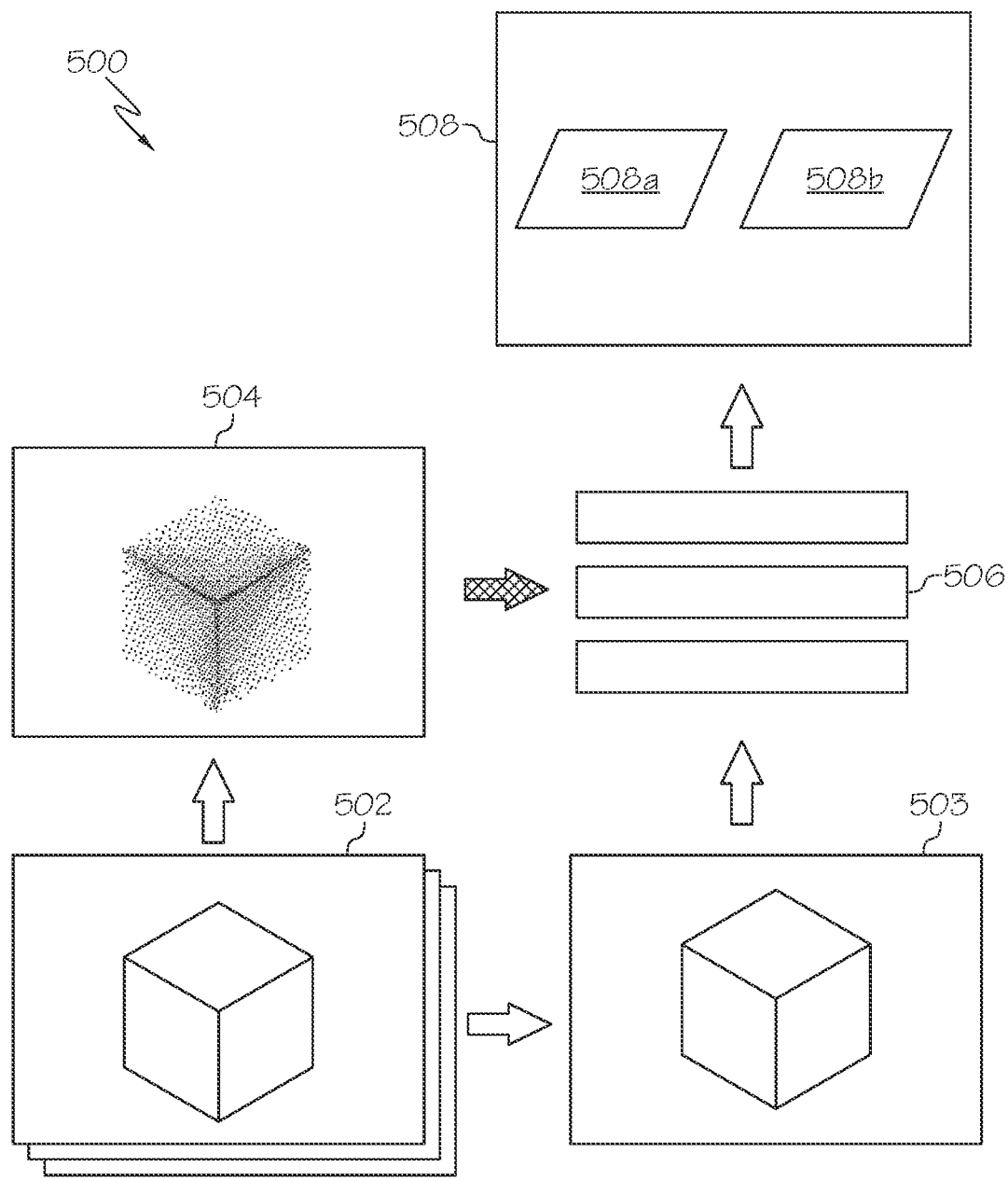
FIG. 5A depicts a diagram corresponding to steps 402-408 of FIG. 4, according to one or more embodiments shown and described herein.

Referring now to FIG. 5A, a diagram 500 corresponding to steps 402-408 of the method 400 is depicted. In step 402, the system 100 receives a set of images 502. The images of the set of images 502 include a cube as a subject in an empty environment. The images of the set of images 502 include various views of the cube. For example, the images may be of the cube in various poses (e.g., front, side, rear, etc.). The images may be captured by a sensor 108 and/or computer-generated.

Still referring to FIG. 5A, in step 404, the system 100 generates sparse depth data 504 from each image of the set of images. The sparse depth data 504 may be separated according to each image and/or combined into one set of sparse depth data 504, such as a point cloud. The sparse depth data 504 may be visually represented, as is the case in FIG. 5A, and/or digitally represented. In either case, the data points in the sparse depth data 504 indicate how far the data point is from the image viewer (e.g., the camera).

Still referring to FIG. 5A, in step 406, the system 100 trains a monocular depth estimation model 506 with the sparse depth data 504. The monocular depth estimation model 506 may be like the monocular depth estimation model 114. The monocular depth estimation model 506 may utilize supervised methods to be trained, and the sparse depth data 504 may provide the supervision. An image 503 from the set of images 502 may be used as training input to the monocular depth estimation model 506. The weights of the monocular depth estimation model 506 may be adjusted based on the sparse depth data 504. For example, a data point from the sparse depth data 504 may be correlated to a pixel from the image 503 such that the geometric features of the image 503 may generate an output 508 having a depth data 508a equivalent to the corresponding data point from the sparse depth data 504 and an uncertainty data 508b indicating a high level of certainty (e.g., >75% certain). The process may be repeated for one or more images of the set of images 502. One or more images of the set of images 502 may also be used to validate the training of the monocular depth estimation model 506.

Still referring to FIG. 5A, in step 408, the system 100 generates depth data 508a and uncertainty data 508b for each image 503 of the set of images 502. After the monocular depth estimation model 506 is trained, the monocular depth estimation model 506 may receive an input image 503. For each pixel of the input image 503, the monocular depth estimation model 506 outputs an estimated depth data 508a along with a corresponding uncertainty data 508b representing how certain the monocular depth estimation model 506 is that the estimated depth data 508a is accurate. For example, the pixels corresponding to the sparse depth data may output a depth data 508a mirroring the sparse depth data as well as an uncertainty data 508b indicating that the certainty is high (e.g., >75% certain). The monocular depth estimation model 506 may also output depth data 508a and uncertainty data 508b for every pixel of each image 503 of the set of images 502.

Figure 5B:
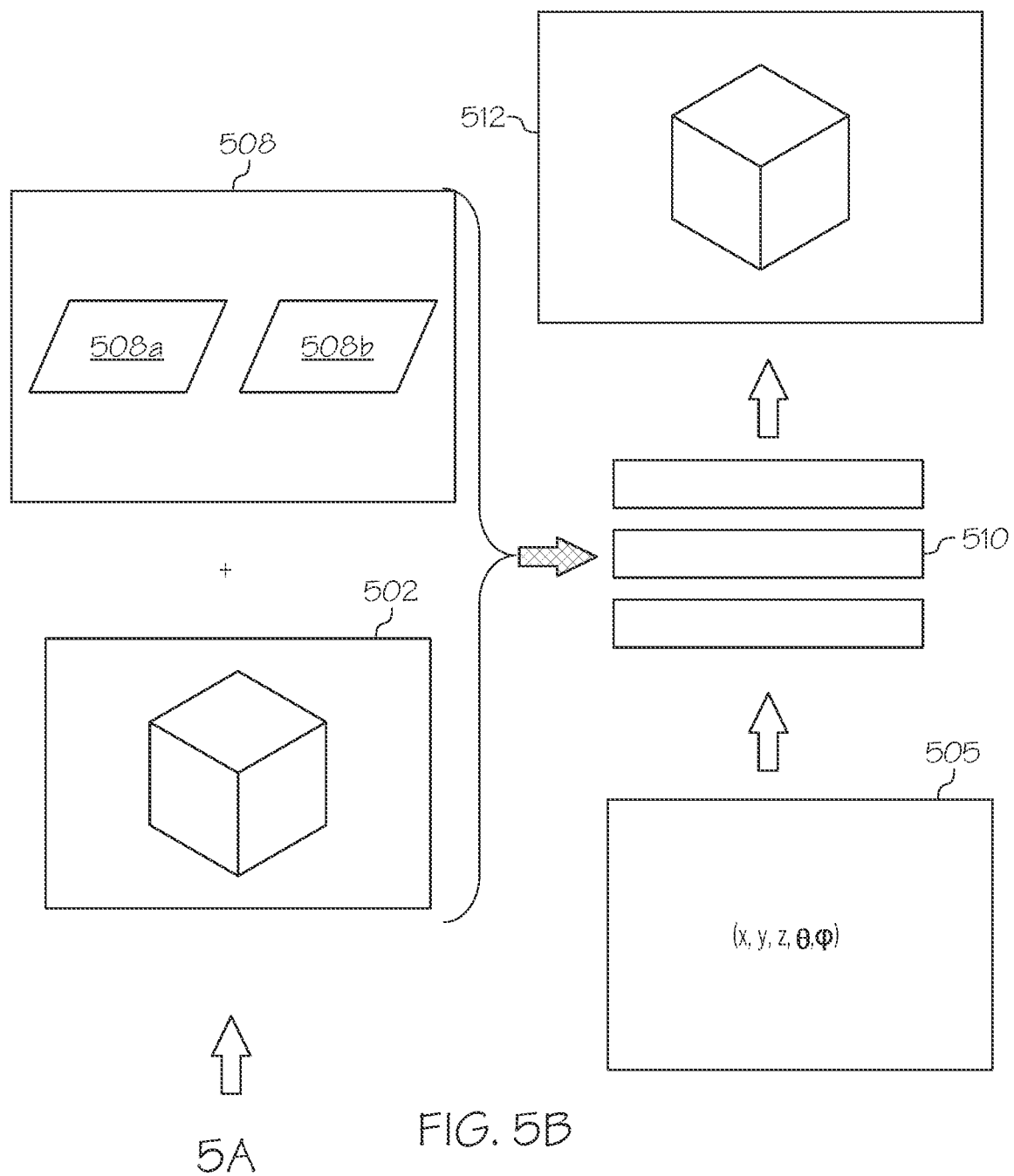
FIG. 5B depicts a diagram corresponding to steps 408-412 of FIG. 4, according to one or more embodiments shown and described herein.

Referring now to FIG. 5B, a diagram corresponding to steps 410-412 of the method 400 is depicted. In step 410, a NeRF model 510, which may be like NeRF model 116, is trained with the set of images 502. The set of images 502 may be the same set of images 502 used to train the monocular depth estimation model 506. Like the monocular depth estimation model 506, the NeRF model 510 may be scene-specific (i.e., trained for the particular scene of the set of input images). The NeRF model 510 is a fully connected network that maps geometric features, such as spatial location and viewing direction (5D input), to color features, such as color and volume density (4D output). In training, the weights of the NeRF model 510 represent the scene of the set of images 502. The weights of the NeRF model 510 are adjusted such that, when a spatial position (x, y, z) and direction ($\theta$, $\phi$) are input, a corresponding color (r, g, b) and volume density ($\sigma$) are output based on the set of images. In addition to mapping the geometric features to the color features, the training is also supervised by the depth data 508a and uncertainty data 508b generated from the monocular depth estimation model 506 in step 408. The supervision includes minimizing depth loss with the estimated depths from the monocular depth estimation model 506. Because much of the depth data 508a is estimated, however, the uncertainty data 508b may be used as a weight to control how important a depth data point is and reduce the influence of potentially unreliable data points.

Still referring to FIG. 5B, in step 412, a new image 512 having a new view of the scene is rendered. Once the NeRF model 510 is trained, the spatial positions in the scene space may be strung together to form a ray. The ray may point in any direction ($\theta$, $\phi$). Accordingly, rendering the new image 512 includes inputting geometric features 505 of the new view into the trained NeRF model 510. The geometric features 505 correspond to the scene that the NeRF model 510 is trained. The geometric features 505 include a spatial position (x, y, z) and direction ($\theta$, $\phi$). The ray can be used to obtain a color (r, g, b) and volume density ($\sigma$) for a particular position (e.g., a depth) along the ray according to the direction ($\theta$, $\phi$) of the ray via the NeRF model 510. The geometric features 505 are input for each pixel and the corresponding color features are retrieved, the geometric features 505 and the color features may be composited into a new image 512 via a differentiable volume rendering function. The differentiable volume rendering function may be any volume rendering technique that takes pairs of color and volume density (e.g., opacity) features of three-dimensional points along rays to output the new image 512.

It should now be understood that embodiments disclosed herein include systems and methods for neural implicit scene representation with dense, uncertainty-aware monocular depth constraints. Embodiments disclosed herein constrain the learning problem by utilizing a neural network that takes as input an RGB image and outputs scene depth, which allows for the ability to impose dense depth and uncertainty supervision in NeRF model training.

It is noted that recitations herein of "at least one" component, element, etc., should not be used to create an inference that the alternative use of the articles "a" or "an" should be limited to a single component, element, etc.

It is also noted that recitations herein of a component of the present disclosure being "configured" or "programmed" in a particular way, to embody a particular property, or to function in a particular manner, are structural recitations, as opposed to recitations of intended use. More specifically, the references herein to the manner in which a component is "configured" or "programmed" denotes an existing physical condition of the component and, as such, is to be taken as a definite recitation of the structural characteristics of the component.

It is also noted that terms like "preferably," "commonly," and "typically," when utilized herein, are not utilized to limit the scope of the claimed invention or to imply that certain features are critical, essential, or even important to the structure or function of the claimed invention. Rather, these terms are merely intended to identify particular aspects of an embodiment of the present disclosure or to emphasize alternative or additional features that may or may not be utilized in a particular embodiment of the present disclosure.

For the purposes of describing and defining embodiments of the present disclosure, it is noted that the terms "substantially" and "approximately" are utilized herein to represent the inherent degree of uncertainty that may be attributed to any quantitative comparison, value, measurement, or other representation. The terms "substantially" and "approximately" are also utilized herein to represent the degree by which a quantitative representation may vary from a stated reference without resulting in a change in the basic function of the subject matter at issue.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

Having described the subject matter of the present disclosure in detail and by reference to specific embodiments thereof, it is noted that the various details disclosed herein should not be taken to imply that these details relate to elements that are essential components of the various embodiments described herein, even in cases where a particular element is illustrated in each of the drawings that accompany the present description. Further, it will be apparent that modifications and variations are possible without departing from the scope of the present disclosure, including, but not limited to, embodiments defined in the appended claims. More specifically, although some aspects of the present disclosure are identified herein as preferred or particularly advantageous, it is contemplated that the present disclosure is not necessarily limited to these aspects.

What is claimed is:

1. A method comprising:
   receiving a set of images, each image depicting a view of a scene;
   generating sparse depth data from each image of the set of images;
   training a monocular depth estimation model with the sparse depth data;
   generating, with the trained monocular depth estimation model, depth data and uncertainty data for each image;
   training a NeRF model with the set of images, wherein the training is constrained by the depth data and uncertainty data; and
   rendering, with the trained NeRF model, a new image having a new view of the scene;
   wherein generating sparse depth data comprises:
      extracting geometric features and color features from each image of the set of images;
      identifying matching geometric features and color features between images of the set of images;
      determining a depth measurement based on the identified matching geometric features and color features; and
      compiling the depth measurements into the sparse depth data.

2. The method of claim 1, wherein the set of images comprises monocular RGB images.

3. The method of claim 1, wherein the NeRF model comprises:
   an input layer that receives geometrics features;
   one or more hidden layers, each hidden layer having a weight; and
   an output layer that generates color features.

4. The method of claim 3, wherein training the NeRF model comprises:
   extracting geometric features and color features from each image of the set of images; and
   adjusting the weights of the NeRF model to map the geometric features of an image to its corresponding color features.

5. The method of claim 1, further comprising receiving geometric features from a user.

6. The method of claim 5, wherein rendering the new view comprises:
   inputting geometric features of the new view into the trained NeRF model;
   generating color features of the new view with the trained NeRF model; and
   compositing the geometric features and the color features into the new image with a differentiable volume rendering function.

7. A system comprising:
   a processor configured to perform operations comprising:
   receiving a set of images, each image depicting a view of a scene;
   generating sparse depth data from each image of the set of images;
   training a monocular depth estimation model with the sparse depth data;
   generating, with the trained monocular depth estimation model, depth data and uncertainty data for each image;
   training a NeRF model with the set of images, wherein the training is constrained by the depth data and uncertainty data; and
   rendering, with the trained NeRF model, a new image having a new view of the scene;
   wherein generating sparse depth data comprises:
      extracting geometric features and color features from each image of the set of images;
      identifying matching geometric features and color features between images of the set of images;
      determining a depth measurement based on the identified matching geometric features and color features; and
      compiling the depth measurements into the sparse depth data.

8. The system of claim 7, wherein the set of images comprises monocular RGB images.

9. The system of claim 8, wherein the NeRF model comprises:
   an input layer that receives geometrics features;
   one or more hidden layers, each hidden layer having a weight; and
   an output layer that generates color features.

10. The system of claim 9, wherein training the NeRF model comprises:
    extracting geometric features and color features from each image of the set of images; and
    adjusting the weights of the NeRF model to map the geometric features of an image to its corresponding color features.

11. The system of claim 7, wherein the processor is configured to perform operations further comprising receiving geometric features from a user.

12. The system of claim 11, wherein rendering the new view comprises:
    inputting geometric features of the new view into the trained NeRF model;
    generating color features of the new view with the trained NeRF model; and
    compositing the geometric features and the color features into the new image with a differentiable volume rendering function.

13. A non-transitory medium having machine-readable instructions that, when executed by a processor, cause the processor to perform operations comprising:
    receiving a set of images, each image depicting a view of a scene;
    generating sparse depth data from each image of the set of images;

training a monocular depth estimation model with the sparse depth data;

generating, with the trained monocular depth estimation model, depth data and uncertainty data for each image;

training a NeRF model with the set of images, wherein the training is constrained by the depth data and uncertainty data; and rendering, with the trained NeRF model, a new image having a new view of the scene;

wherein generating sparse depth data comprises:
  extracting geometric features and color features from each image of the set of images;
  identifying matching geometric features and color features between images of the set of images;
  determining a depth measurement based on the identified matching geometric features and color features; and compiling the depth measurements into the sparse depth data.

14. The non-transitory medium of claim 13, wherein the set of images comprises monocular RGB images.

15. The non-transitory medium of claim 13, wherein the NeRF model comprises:

an input layer that receives geometrics features;

one or more hidden layers, each hidden layer having a weight; and an output layer that generates color features.

16. The non-transitory medium of claim 15, wherein training the NeRF model comprises:

extracting geometric features and color features from each image of the set of images; and adjusting the weights of the NeRF model to map the geometric features of an image to its corresponding color features.

17. The non-transitory medium of claim 13, wherein rendering the new view comprises:

receiving geometric features from a user;

inputting geometric features of the new view into the trained NeRF model;

generating color features of the new view with the trained NeRF model; and compositing the geometric features and the color features into the new image with a differentiable volume rendering function.

* * * * *